United States Patent [19]
Berggren

[11] 3,794,394
[45] Feb. 26, 1974

[54] RECORD STORAGE RACKS

[75] Inventor: Lloyd E. Berggren, Minneapolis, Minn.

[73] Assignee: Technology Application Corporation, Minnetonka, Minn.

[22] Filed: Apr. 24, 1972

[21] Appl. No.: 246,742

[52] U.S. Cl. .................................................. 312/19
[51] Int. Cl. .................................................. A47b 81/06
[58] Field of Search ....... 312/10, 13, 14, 15, 18, 19; 211/40

[56] References Cited

UNITED STATES PATENTS

| | | | |
|---|---|---|---|
| 2,535,609 | 12/1950 | Spillman | 312/19 |
| 3,353,882 | 11/1967 | Bodoh et al. | 312/10 |
| 1,310,814 | 7/1919 | Ward | 312/10 |
| 3,582,168 | 6/1971 | Bian | 312/19 |
| 3,107,816 | 10/1963 | Teague, Jr. et al. | 312/18 X |

*Primary Examiner*—James C. Mitchell
*Attorney, Agent, or Firm*—Jacobson and Johnson

[57] ABSTRACT

An improved record storage rack is provided having a plurality of compartments for holding a plurality of records in a vertical position, the storage rack including a rotatable mounted wheel for frictionally engaging the edge of the record in order to displace the record from the stack thus allowing the user to quickly and easily pull the record from the storage rack.

8 Claims, 5 Drawing Figures

RECORD STORAGE RACKS

BACKGROUND OF THE INVENTION

1. Field of the Invention

This invention relates generally to disc storage racks and, more specifically, to storage racks for holding discs such as records.

2. Description of the Prior Art

There are numerous record storage racks available for holding records, however, most of these units store a record within a stack by leaving the jacket around the record. For example, a typical record storage rack is shown in the Punt U.S. Pat. No. 3,227,282 in which the record and the jacket is placed in the record storage rack. In order to remove a record from the record jacket, the record jacket is bent causing the jacket to bow outward so that one can reach into the jacket to grasp the record and remove it from the jacket. However, as frequently encountered with this type of record storage rack, a person will select a number of records to be played and invariably replaces them into the wrong jacket. Thus, after awhile records become mixed up and the user is just as well off not to have the jackets on. Furthermore, this type of arrangement has a very low record stacking density as room must be left for the fingers to grasp the record as well as space for the bulky jacket. The present invention overcomes some of the problems of prior art record storage racks by providing an easily indexable and compact unit for safely storing the records.

SUMMARY OF THE INVENTION

Briefly, the invention comprises a record storage rack in which a plurality of separators are located in spaced relationship to provide individual storage compartments for the records. A manual rotatable wheel located on a shaft is brought into frictional engagement with the edge of the record to rotate the record and displace it from the record compartment so that the user can easily grasp the edge of the record and remove it.

DESCRIPTION OF THE PREFERRED EMBODIMENT

Figure 1:
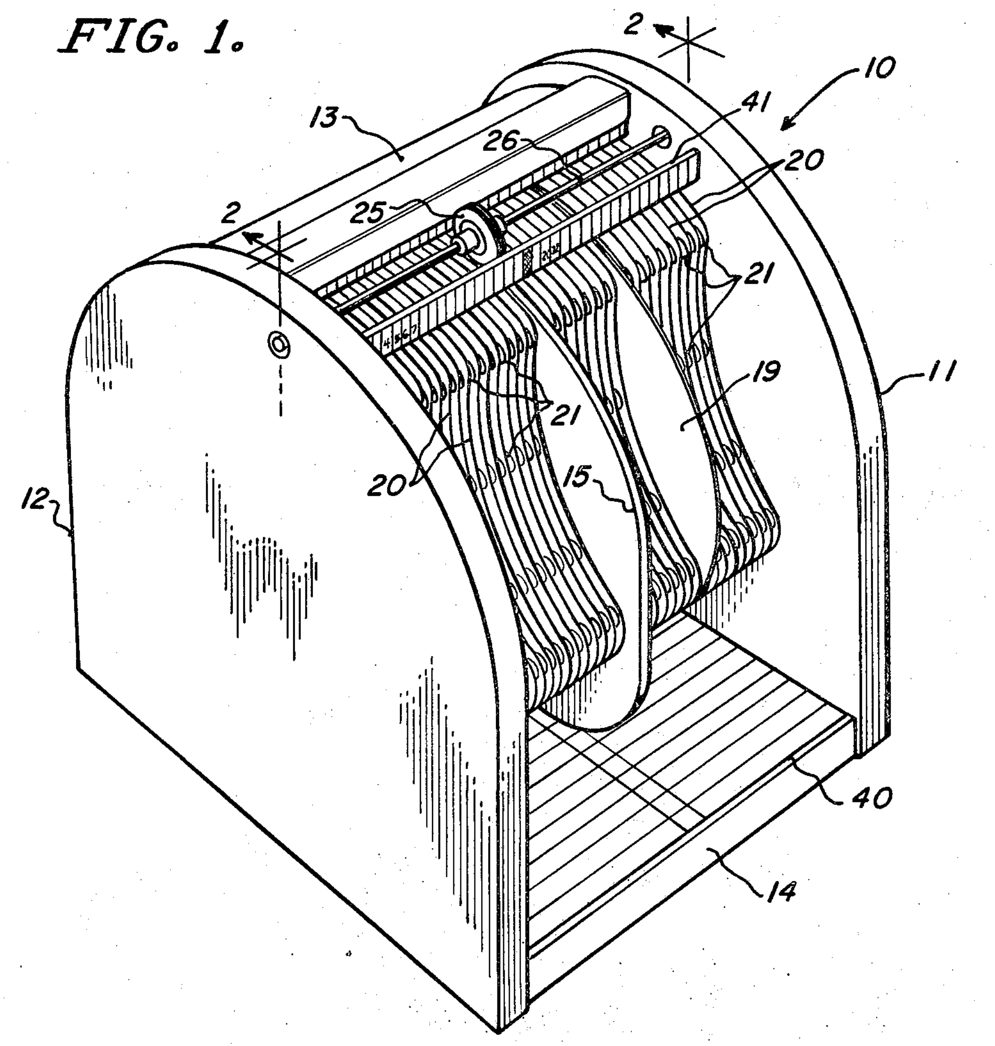
FIG. 1 is a perspective view of my record storage rack.

Referring to the drawing shown in FIG. 1, reference numeral 10 designates my record storage and selector case. Record storage and selector case 10 comprises a first side wall 11 and a second side wall 12. Side walls 11 and 12 are joined to one another by a bottom member 14 and a back member 13.

Case 10 may be made out of any suitable material such as plastic or wood but wood is the preferred material as it can be made with a finish similar to the finish on the furniture or the record player.

Located within the confines of record selector case 10 are a plurality of separator sheets 20 having slight protrusions or dimples 21 thereon. As dimples 21 are identical to one another, they will hereinafter all be referred to by reference numeral 21. Also, as separator sheets 20 are identical in size and shape, they will hereinafter all be designated by reference numeral 20. Dimples 21 are located in oppositely disposed manner to form support areas for holding the record in the middle of the compartment. Preferably separator sheets 20 are made from material which is softer than the record itself. This prevents the record from being scratched or harmed as it is placed in the storage slot. A typical example of suitable material used is polystyrene. A record 19 is shown located in a compartment formed by separators 20 and as all the records are identical in shape, the same reference numeral for a record is used throughout the drawings. In the present embodiment a divider 15 is located in the middle of the case for purposes of maintaining two groups of records within the record holder, however, it is not necessary to have divider 15.

Located on the top portion of the record holder is an indexing mechanism for displacing a record from the record compartment. The mechanism comprises a rotatably mounted wheel 25 that can slide laterally along shaft 26. Wheel 25 and shaft 26 are more clearly shown in FIG. 2 in which the ends of cylindrical shaft 26 are resiliently mounted in members 11 and 12. Shaft 26 has an opening in both ends to allow a pin 30 to pass through shaft 26 and into member 11. Located around pin 30 and on the underside of shaft 26 is a spring 32 and similarly located around pin 30 and on the top side of shaft 26 is a spring 31. As the opening in the shaft 26 is larger than pin 30, it allows shaft 26 to be moved or slid along pin 30. Similarly, the other end of shaft 26 has a pin 33 and springs 34 and 35 that allow for upward and downward movement of shaft 26. The downward movement of shaft 26 causes wheel 25 to be forced into frictional engagement with the edge of record 19. With wheel 25 in frictional engagement with record 19, a slight rotation of wheel 25 displaces record 19 in case 10.

Figures 2, 3:
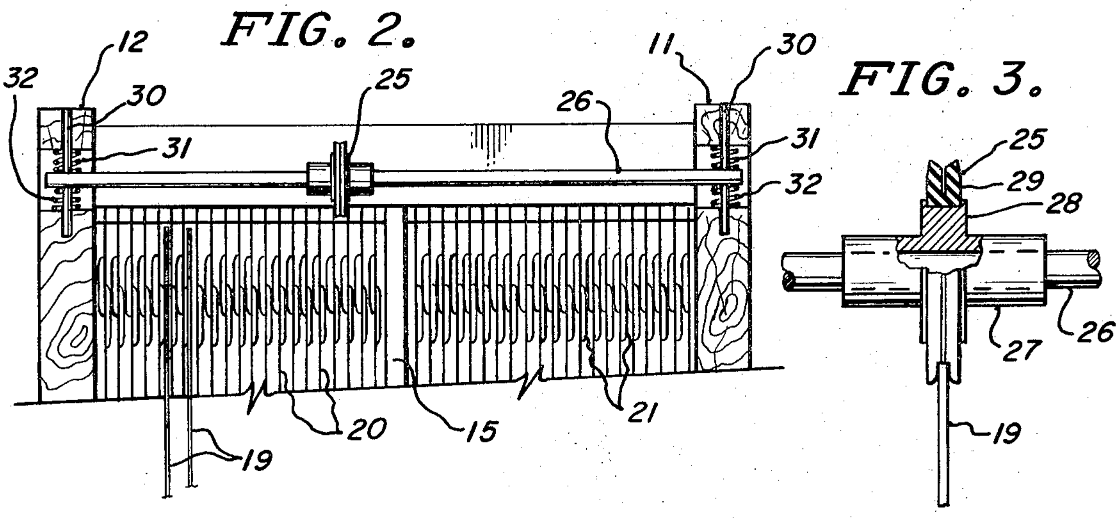
FIG. 2 is a sectional view taken along the lines 2—2 of FIG. 1.
FIG. 3 is an enlarged sectional view of the frictional record engaging wheel for displacing a record from the stack.

Referring to FIG. 3, the details of wheel 25 are shown more clearly. Wheel 25 comprises an outer frictional surface 29 for engagement with the edge of the record, an inner support surface 28 and an outer sleeve 27 having an opening therein to allow wheel 25 to rotate on shaft 26. Wheel 25 can rotate freely on shaft 26 as well as slide laterally or longitudinally along shaft 26. Because wheel 25 can slide longitudinally along shaft 26, it can be slid into alignment with the edge of the record that is to be removed from the case. In order to facilitate indexing, etc. of the records, there are provided two indicators, one a descriptive index 40 which is located at the bottom of the record case. In the descriptive index the title of the record and its corresponding identification number can be written down. The identification number is also printed on the index bar 41 at the top of case 10. These numerals or identification numbers correspond to the openings between the separator plates to identify the slot for the record. In addition, by also placing the identification number in the center of the record the user can quickly facilitate replacement of the record in the proper compartments.

Typically, in operation of the storage case, the record user first determines the record he wants from the stack by referring to descriptive index 40 which is the removable index located on the bottom of case 10. After the operator determines the particular record he then determines the identification number corresponding to that record which may be, for example, 17. The operator then slides wheel 25 over record compartment number 17. Next, the operator presses downward on wheel 25 thus moving shaft 26 downward along pins 30 and 33. Downward motion continues until the frictional engaging surface 29 engages the edge of record 19. After surface 29 is in frictional engagement with record 19, the operator rotates wheel 25 backward or counterclockwise around shaft 26 thus displacing the record from the stack of records. The operator then takes his other hand and grasps the edge of the record to pull it out. Similarly, for any remaining records he wants he repeats the process of selecting and removing the record from the record rack. Thus, it can be envisioned that the present invention provides a neat, efficient and compact record storage case.

In another embodiment of my invention a cover is placed over a record case 10 to protect the records from dust and the like. However, for purposes of clarity it has been omitted from this drawing. Further embodiments include a handle for carrying the record storage case. Other improvements, etc., which are within the scope of my invention are the use of a decorative outside case. Also, the record case can be wider or narrower to accommodate more or less records. In a typical embodiment the number of records that can be stored varies from six to eight records per inch.

Figure 4:
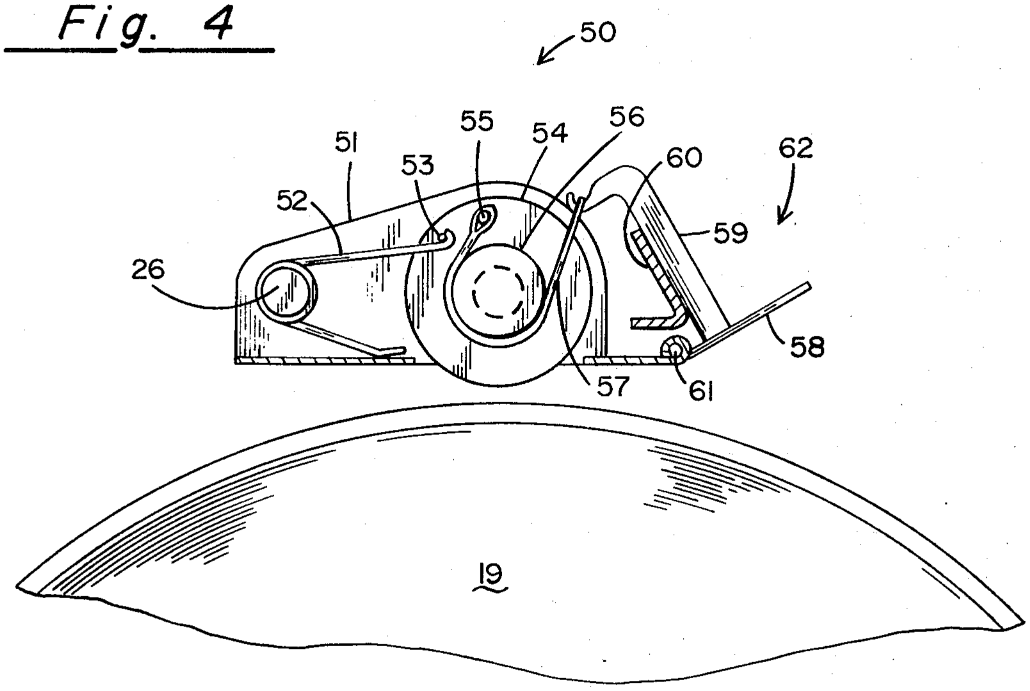
FIG. 4 is a sectional view of another embodiment of a frictional record engaging wheel for displacing a record from the stack in a single motion

Referring to FIG. 4, there is shown an alternate embodiment of my frictional record engaging member. The frictional record engaging member shown in FIG. 4 is similar to the one shown in FIG. 3, however, the embodiment shown in FIG. 4 is lever operated and displaces the record from the stack in one motion of the operator's hand.

The record displacing unit shown in FIG. 4 is generally designated by reference numeral 50. The unit comprises a frame 51 which is slidably mounted on shaft 26. Located around shaft 26 is a spring 52 which forms engagement with the bottom of housing 51 and with a pin 53 located on wheel 54. Wheel 54 is rotatably mounted to the frame to allow both clockwise and counterclockwise rotation of the wheel. Spring 52 is in compression thus exerting a force upward to produce a clockwise force on wheel 54. Also attached to wheel 54 is a pin 55 and a string 57 which passes around a drum 56 located on and attached to wheel 54. String 57 attaches to a L-shaped pivotal member 62 comprised of a finger engaging lever arm or tab 58 and an indexing engaging section 59. Lever arm 58 is pivotally mounted to housing 51 by a pivot pin 61. Located within the housing member is an indexing bar 60 which contains numbers corresponding to the record in the case. The indexing bar serves a dual function in that it also holds mechanism 50 away from the record by allowing section 59 to engage the front portion of indexing bar 60.

In operation of record displacing mechanism 50, the operator first slides mechanism 50 over the proper record. He then pushes downward on bar 58. The downward motion of bar 58 causes housing 51 to pivot clockwise around shaft 26 thus bringing wheel 54 into frictional engagement with record disk 19. As mentioned previously, housing 51 is normally spaced from the record by indexing bar 60. That is, when bar 58 is pushed downward it allows housing 51 to move downward thus allowing wheel 54 to come into frictional engagement with record 19. As one continues to push downward on tab 58, it increases the force between wheel 54 and record disc 19. As the force is increased on tab 58, it also causes member 62 to pivot about pivot pin 61. The pivotal motion about pin 61 causes upward motion on string 57. As string 57 is in positive engagement with pin 55, it causes wheel 54 to rotate in a counterclockwise direction. The counterclockwise motion of wheel 54, which is in frictional engagement with the record, rotates the record to displace it from the stack of records. The operator then grasps the record with his thumb and fore-finger to remove it from the stack. In order to release the mechanism, the operator releases tab 58. The force of spring 52 now predominates causing wheel 54 to rotate clockwise thus rotating mechanism 50 counterclockwise by the engagement of member 59 with indexing bar 60.

While this particular embodiment shows a unit for displacing a record from a stack in one motion, it is also envisioned that other variations are within the scope of my invention. In other variations of my invention, it is envisioned that each of the divider sheets have protrusions or dimples on both sides in a pattern common to all the divider sheets. Thus each sheet can be reversed from its adjacent sheet when installed in the base unit to provide support areas between the protrusions of adjacent sheets. This pattern allows the dividers to interact to space and support each other by the pressure of protrusions against each other. Furthermore, because the protrusions are resilient they permit a record to be inserted between the divider sheets thus providing firm controlled spacing of the records. The dimples or protrusions, while shown as closed surfaces in the preferred embodiment, may be slit radially in order to minimize the pressure or rubbing action on the records as they are placed in or removed from the storage rack.

Figure 5:
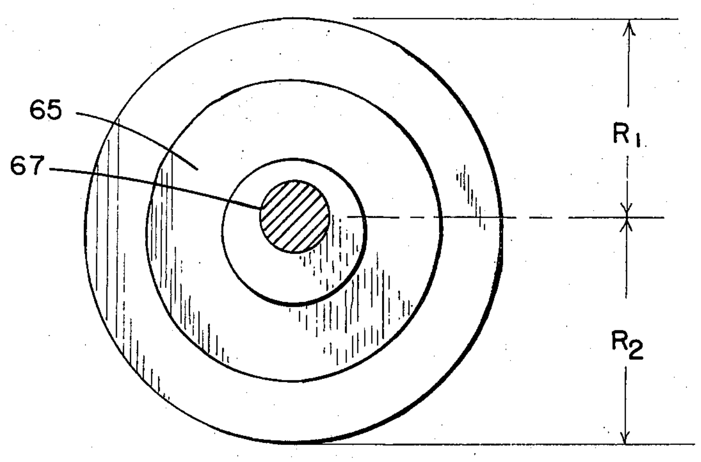
FIG. 5 is an end view of the wheel with an off-set center.

In still another embodiment of my invention, shown in FIG. 5 I utilize a record engaging member comprising a wheel 65 in which the center shaft 67 is offset. In another embodiment the rim has been cut along a chord to leave a flat section on the wheel. In the embodiment of FIG. 5, I position the shorter wheel radius $R_1$ so that the wheel will not engage the record but instead slide longitudinally along a shaft 67 spaced over the records. However, the larger radius $R_2$ of the wheel can be brought into frictional engagement with the record to enable one to remove it from the storage slot by turning the wheel. In this embodiment, it is envisioned that the shaft could be slotted so that the wheel could be slidably keyed to the shaft. The shaft could then be resiliently mounted in a rotational manner so that the shaft would return to a predetermined orientation once the pressure on the wheel is removed.

I claim:

1. A rack for storage of record discs comprising: a base having record supporting compartments and a record dispensing mechanism therein; a plurality of separators located on said base, said plurality of separators coacting to provide a record supporting compartment for a record, each of said separators having resilient dimples thereon for engagement with a record to thereby space said record in said compartment, said resilient dimples interacting to space and support said plurality of separators, said resilient dimples comprising material that has a hardness less than the hardness of the record to thereby prevent said resilient dimples from marring the record; an indexing mechanism, said indexing mechanism comprising a member mounted in said base a predetermined distance from the record supporting compartment, said indexing mechanism including rotatably mounted means located on said member and slidable laterally along said member for alignment with a record supporting compartment formed by said plurality of separators, a frictional record engaging surface located on said rotatably mounted means, further means operable to bring said frictional record engaging surface into contact with a record in the record supporting compartments; said frictional record engaging surface operable to frictionally engage the edge of a record located in a record compartment so that rotation of said rotatably mounted means displaces a record from said rack to thereby allow an operator to grasp the edge of the record and remove it from said rack.

2. The apparatus of claim 1 wherein said rotatably mounted means comprises a wheel.

3. The invention of claim 2 wherein said indexing mechanism includes a designation means for identifying the record in each compartment.

4. The invention of claim 3 wherein said member mounted in said bases comprises a shaft resiliently mounted in said base.

5. The invention of claim 4 in which said frictional engaging surface comprises a rubber rim located around said rotatably mounted means.

6. The invention of claim 2 in which said indexing mechanism includes a pivotal mounted tab for rotating said wheel and displacing said record in one motion.

7. The invention of claim 2 in which said wheel has an offset center.

8. The invention of claim 5 in which said dimples have a slit therein.

* * * * *